US005762098A

United States Patent [19]

Manzone et al.

[11] Patent Number: 5,762,098

[45] Date of Patent: Jun. 9, 1998

[54] FLUID MIXING DEVICE, PARTICULARLY FOR INDUSTRIAL INKS OR PAINTS

[75] Inventors: Michele Manzone, Barolo; Luca Drocco, Corneliano, both of Italy

[73] Assignee: Dromont s.r.l., Grinzane Cavour, Italy

[21] Appl. No.: 568,353

[22] Filed: Dec. 6, 1995

[30] Foreign Application Priority Data

Dec. 7, 1994 [IT] Italy ................................ TO94A1003

[51] Int. Cl.[6] .............................. B67D 5/52; F16K 31/02; F16K 31/53; F16K 37/00

[52] U.S. Cl. ........................ 137/312; 137/554; 137/635; 141/104; 222/108; 222/135; 222/144; 222/144.5; 251/58; 251/94; 251/95; 251/113; 251/129.04; 251/249.5

[58] Field of Search .................................. 137/635, 312, 137/313, 554; 141/104, 329; 222/108, 144, 144.5, 544, 135, 309; 251/248, 249.5, 58, 94, 95, 111, 113, 129.04

[56] References Cited

U.S. PATENT DOCUMENTS

| | | | |
|---|---|---|---|
| 2,787,402 | 4/1957 | Stiner et al. | 141/104 |
| 2,923,438 | 2/1960 | Logan et al. | 141/104 |
| 3,015,415 | 1/1962 | Marsh et al. | 222/144 |
| 3,017,900 | 1/1962 | Olson | 137/635 |
| 3,029,847 | 4/1962 | Baudhuin et al. | 222/144 |
| 3,042,259 | 7/1962 | Engel | 222/144 |
| 3,066,830 | 12/1962 | Heiss et al. | 222/144 |
| 3,074,597 | 1/1963 | Felts | 222/144 |
| 3,321,108 | 5/1967 | Bowe | 222/144 |
| 4,046,289 | 9/1977 | Hoekstra et al. | 222/16 |
| 4,153,076 | 5/1979 | McNeil et al. | 137/635 |
| 4,323,221 | 4/1982 | Krober et al. | 251/58 |
| 4,585,148 | 4/1986 | Ito | 141/104 |
| 4,967,938 | 11/1990 | Hellenberg | 141/104 |
| 5,078,302 | 1/1992 | Hellenberg | 141/104 |
| 5,119,973 | 6/1992 | Miller et al. | 141/104 |
| 5,215,131 | 6/1993 | Poy | 141/130 |
| 5,474,211 | 12/1995 | Hellenberg | 141/104 |
| 5,558,251 | 9/1996 | Neri | 222/144 |

FOREIGN PATENT DOCUMENTS

| | | |
|---|---|---|
| 2 540 401 | 8/1989 | France . |
| 9 201 045 | 8/1993 | Netherlands . |
| 2 060 563 | 5/1981 | United Kingdom . |
| 2 151 362 | 7/1985 | United Kingdom . |

*Primary Examiner*—George L. Walton
*Attorney, Agent, or Firm*—Michael N. Meller

[57] ABSTRACT

An automatic fluid mixing device wherein a cylindrical supporting structure supports a first number of valves angularly spaced along a first circumference, and a second number of valves angularly spaced along a second circumference concentric with and inside the first; the valves are three-way types, and present a control rod extending axially from one end; and the mixing device presents a blade type selecting device movable angularly about an axis through the center of the circumferences, and which singly engages an end portion of the control rod to move the rod axially and so open the valve.

13 Claims, 3 Drawing Sheets

1
3
5
7
7a
11
13
14
16
17
19
24
26
28
29
31
33
36
37
39
39a
39b
40
40a
40b
43
46
48
50
52
54
56
58
60
62
64
64d
66
68
70
74
75
76
77
79
80
81
82
84
86
86a
89
90
92
93
94
96
96a
96b
98
99
100
101
107
113
115
116
II
III
X
Y

FLUID MIXING DEVICE, PARTICULARLY FOR INDUSTRIAL INKS OR PAINTS

BACKGROUND OF THE INVENTION

The present invention relates to an automatic fluid mixing device, particularly for industrial inks or paints.

Automatic fluid mixing devices are known which provide for automatically mixing and dispensing a number of fluids, e.g. industrial inks or paints, of different colours.

For example, GRACO INC. U.S. Pat. No. 4,046,287, relates to a mixing station wherein a horizontal surface supports a number of two-way valves arranged in an arc; each valve is a normally-closed type communicating at the inlet with a respective paint tank, and at the outlet with a collecting tank, and is opened by a respective axially-sliding control rod.

The mixing station comprises a selecting device presenting a gripping head movable angularly along the arc and which is set to predetermined angular positions in which it engages the control rod of a single valve; and the station also presents a device for axially moving the gripping head to open the valve.

Known fluid mixing devices are bulky, expensive to produce, and fail to provide for mixing a large number of different fluids (inks or paints).

SUMMARY OF THE INVENTION

It is an object of the present invention to provide a mixing device designed to eliminate the drawbacks typically associated with known devices.

According to the present invention, there is provided a mixing device as claimed in claim 1.

BRIEF DESCRIPTION OF THE DRAWINGS

A preferred, non-limiting embodiment of the present invention will be described by way of example with reference to the accompanying drawings, in which.

DETAILED DESCRIPTION OF THE INVENTION

Figure 1:
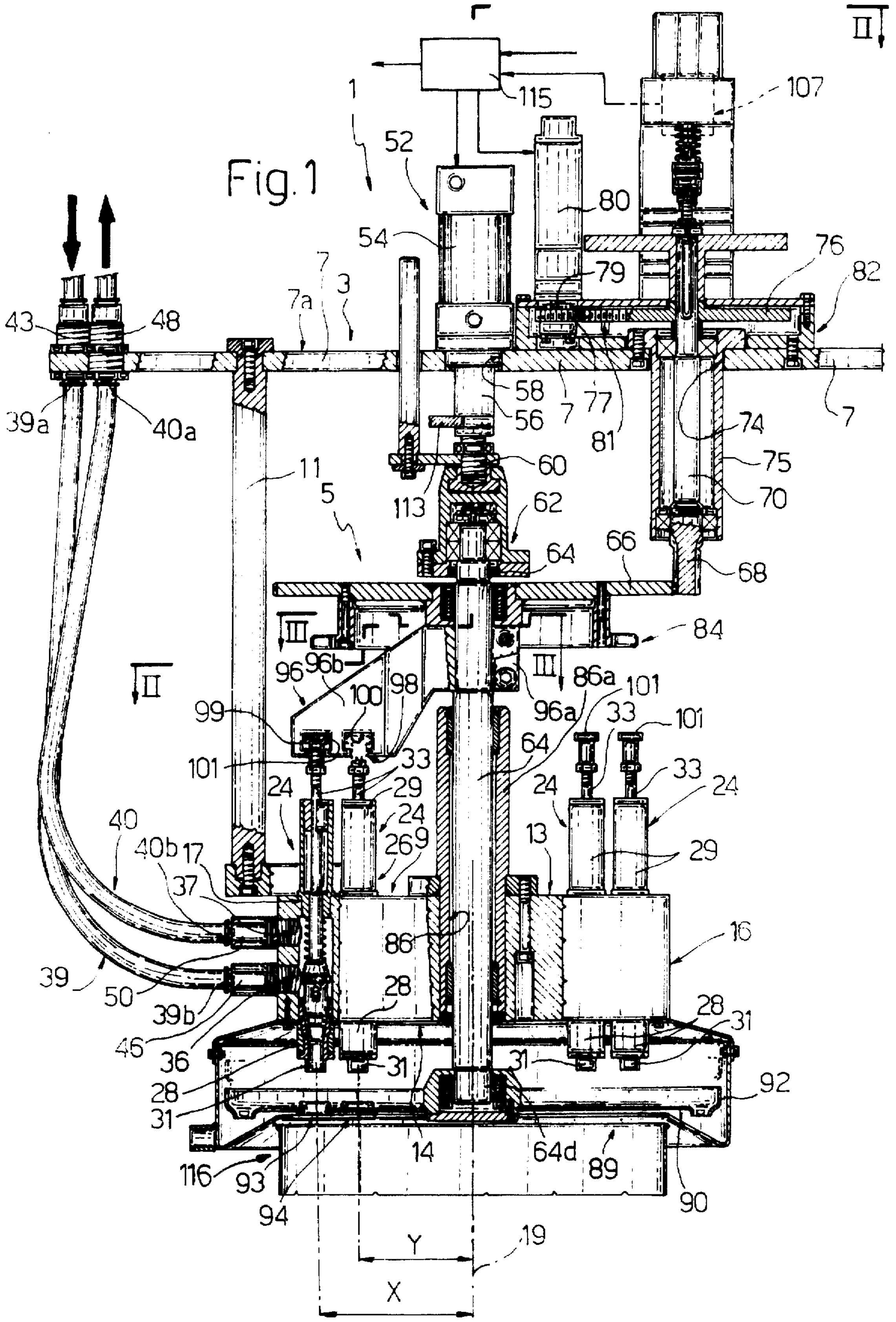
FIG. 1 shows a partially sectioned side view of a mixing device in accordance with the teachings of the present invention.
Figure 2:
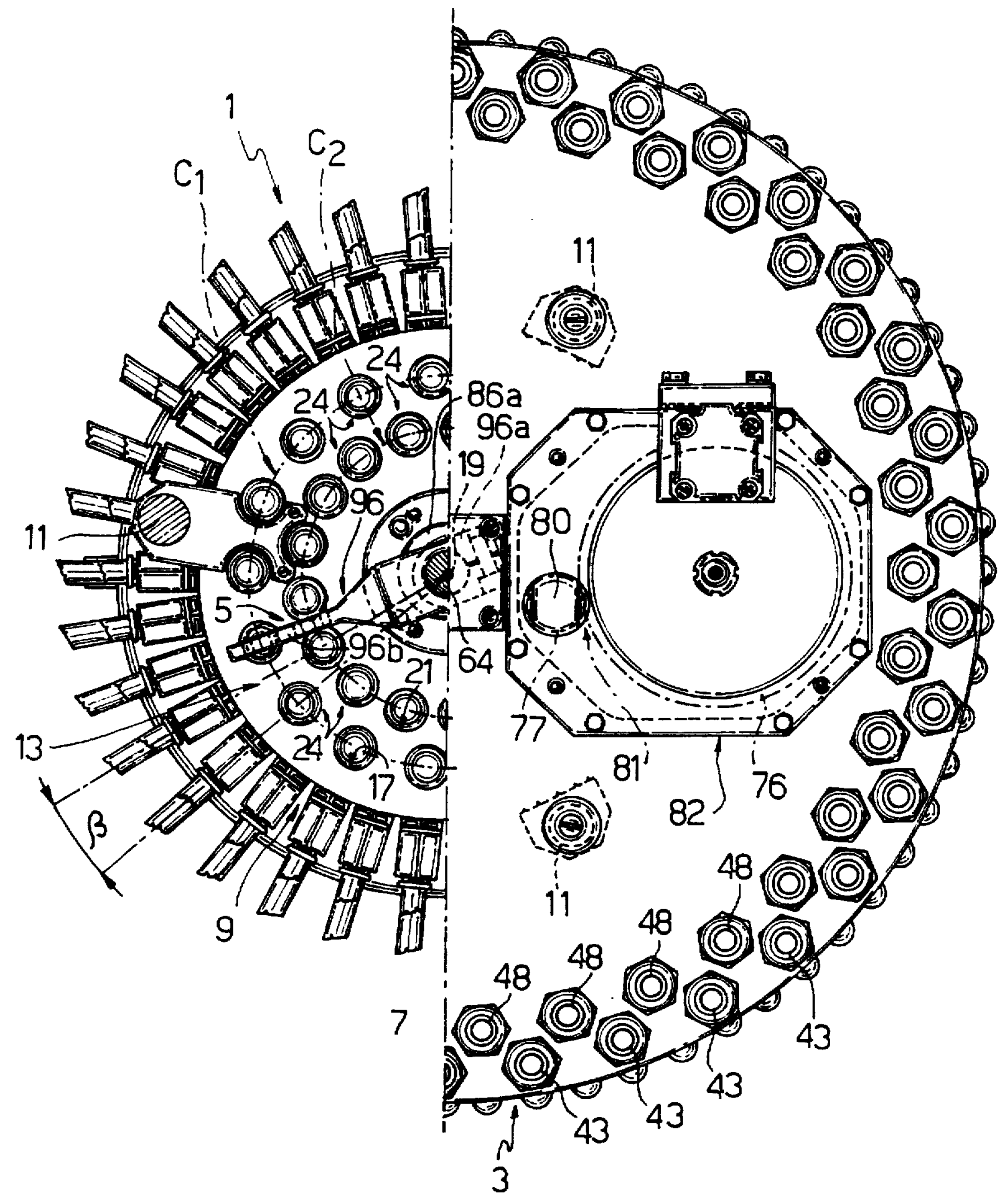
FIG. 2 shows a section of the device along line II—II in FIG. 1.

Number 1 in FIGS. 1 and 2 indicates a fluid mixing device (tintometer), in particular for industrial inks or paints, comprising a metal supporting structure 3, and a movable unit 5 fitted to supporting structure 3.

Supporting structure 3 comprises a circular metal upper plate 7, and a cylindrical structure 9 beneath upper plate 7 and connected to it by three straight, parallel uprights 11 extending perpendicularly between cylindrical structure 9 and upper plate 7. Cylindrical structure 9 is defined by a circular flat upper wall 13 facing upper plate 7, by a circular flat lower wall 14, by a cylindrical lateral wall 16, and is made of synthetic material.

Cylindrical structure 9 presents a first number of through holes 17 parallel to axis 19 of structure 9 and arranged along a first circumference C1 (FIG. 2) presenting a radius X and close to the edge of structure 9.

In the example shown, said first number of holes 17 comprises sixteen holes.

Cylindrical structure 9 also presents a second number of holes 21 arranged along a second circumference C2 (FIG. 2) concentric with and inside first circumference C1 and presenting a radius Y.

In the example shown, said second number of holes 21 comprises sixteen holes.

The center of each hole 17 is spaced angularly in relation to the centers of the adjacent holes 21 by a constant angle $\beta$ of about 22° (FIG. 2).

Each hole 17 and 21 houses a respective known two-way valve 24 comprising an axially symmetrical casing 26 extending outside hole 17, 21 and presenting a first portion 28 extending from lower wall 14, and a second portion 29 extending from wall 13. The free end of first portion 28 presents an axial nozzle 31; the free end of second portion 29 presents an axial control rod 33; and each valve 24 comprises a fluid inlet 36 and a recirculating outlet 37 communicating respectively with delivery and recirculating hoses 39 and 40 extending between upper plate 7 and cylindrical structure 9.

More specifically, each delivery hose 39 presents a first end **39*a* fitted to a connecting device 43 in turn fitted to plate 7; and a second end 39*b* connected to a joint 46 extending from lateral wall 16 and communicating with inlet 36 of valve 24. Similarly, each recirculating hose 40 presents a first end 40*a* fitted to a connecting device 48 in turn fitted to plate 7; and a second end 40*b* connected to a joint 50 extending from lateral wall 16 of structure 9 and communicating with outlet 37 of valve 24. Control rod 33 is movable between a closed position (FIG. 1) wherein valve 24 is closed and all the fluid supplied to inlet 36 is recirculated, and a fully open position (not shown) wherein all the fluid supplied to inlet 36 flows out through nozzle 31. To switch from the closed to the fully open position, control rod 33 is moved axially away from structure 9; and when the control rod is set to intermediate positions between the closed and fully open position, part of the fluid is recirculated, and part of it flows out through nozzle 31**.

With reference to FIG. 1, movable unit 5 comprises a pneumatic actuator 52 fitted to plate 7 and in turn comprising a cylindrical casing 54 substantially coaxial with axis 19 and extending from upper face **7*a* of plate 7, and an output member 56 coaxial with axis 19 and extending towards structure 9 through a central hole 58 in plate 7. Output member 56 is movable axially back and forth along axis 19, and presents a free end 60 connected, via the interposition of a connecting support 62, to the top end portion of a shaft 64 coaxial with axis 19; which connecting support 62 (known type) provides for axially connecting output member 56 and shaft 64, and permits rotation of shaft 64 about axis 19**.

Shaft 64 is fitted at the top with a gear 66 close to support 62 and meshing with a pinion 68 fitted to the bottom end of a shaft 70 extending parallel to and on one side of axis 19. Shaft 70 extends through a hole 74 in plate 7 and is supported by a tubular conduit 75; and the top end of shaft 70 on the opposite side of plate 7 to the bottom end is fitted with a gear 76 meshing with a gear 77 fitted to the output shaft 79 of a pneumatic motor 80 extending parallel to casing 54 from a gearbox 82 housing gears 76, 77 and fitted to plate 7.

Via the transmission formed by gears 76, 77, 66 and pinion 68, the rotation of pneumatic motor 80 is thus transmitted to shaft 64 to rotate it about axis 19.

Figure 4:
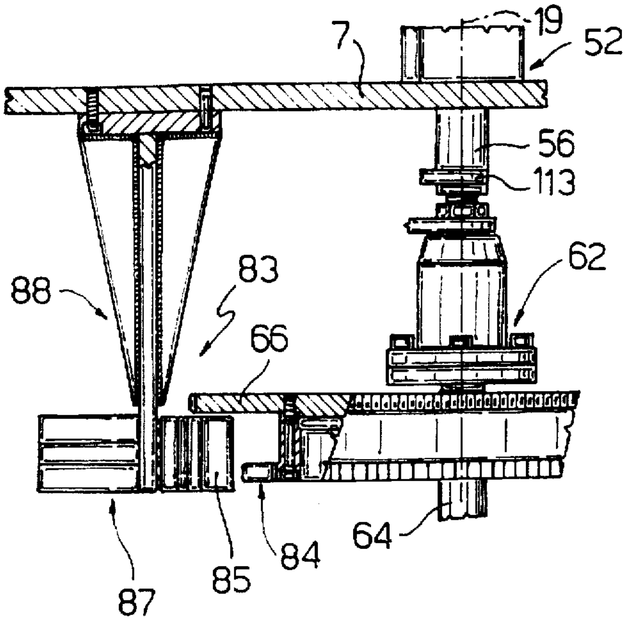
FIG. 4 shows a section of the device along line IV—IV in FIG. 3.
Figure 3:
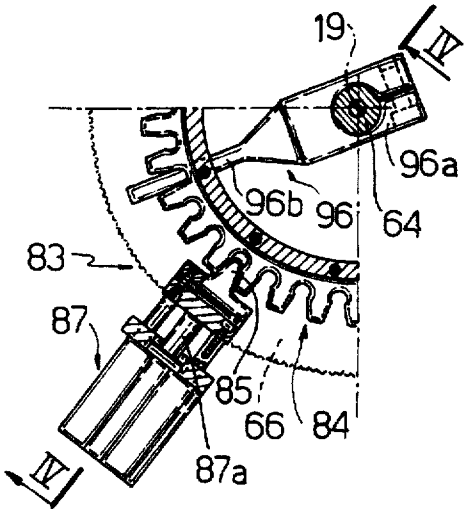
FIG. 3 shows a section of the device along line III—III in FIG. 1.

Mixing device 1 also presents an angular positioning and clamping device 83 (FIGS. 3 and 4) for determining a number of stable angular positions of shaft 64 about axis 19. Device 83 comprises a ring gear 84 beneath and fitted stably to gear 66 (FIG. 4); and a trapezoidal-section punch 85 (FIGS. 3 and 4) movable back and forth towards ring gear 84, and which fits between two adjacent teeth on gear 84 to lock shaft 64 in a given angular position (FIG. 3). More specifically, punch 85 is fitted to the free end of the output shaft 87*a* of a hydraulic actuator 87 in turn fitted to a bracket 88 extending towards structure 9 from plate 7.

The bottom portion of shaft 64 extends through a central hole 86 in cylindrical structure 9 (FIG. 1), and presents a bottom end portion 64*d* projecting from structure 9 and fitted with a drip tray 89. More specifically, drip tray 89 comprises a flat circular wall 90 perpendicular to axis 19 and fixed stably to shaft 64, and a raised peripheral edge 92 substantially perpendicular to wall 90.

Wall 90 presents a first through hole 93, the center of which is substantially the same distance X from axis 19 as between axis 19 and the center of a hole 17.

Wall 90 also presents a second through hole 94, the center of which is substantially the same distance Y from axis 19 as between axis 19 and the center of a hole 21.

Movable unit 5 also comprises a blade type selecting-actuating device 96 fitted to shaft 64 and located between gear 66 and cylindrical structure 9.

Selecting device 96 comprises a parallelepiped first portion 96*a* fitted to shaft 64; and a flat second portion 96*b* integral with the first portion, and presenting a substantially trapezoidal contour with a straight bottom edge 98 facing and parallel to wall 13. Second portion 96*b* presents a first T-shaped through opening 99 which opens out at edge 98, and the axis of which is substantially distance X from axis 19.

Second portion 96*b* also presents a second T-shaped through opening 100 which opens out at edge 98, and the axis of which is substantially distance Y from axis 19.

Control rods 33 of valves 24 present T-section end portions 101 for engaging openings 99 and 100 as described later on. More specifically, end portions 101 of valves 24 along circumference C1 engage first opening 99, and end portions 101 of valves 24 along circumference C2 engage second opening 100.

Mixing device 1 also presents a first position sensor 107 for determining the angular position of shaft 64 about axis 19 and hence the location of selecting device 96 along circumference C1, C2, and which conveniently comprises an encoder connected to gear 76.

Figure 6:
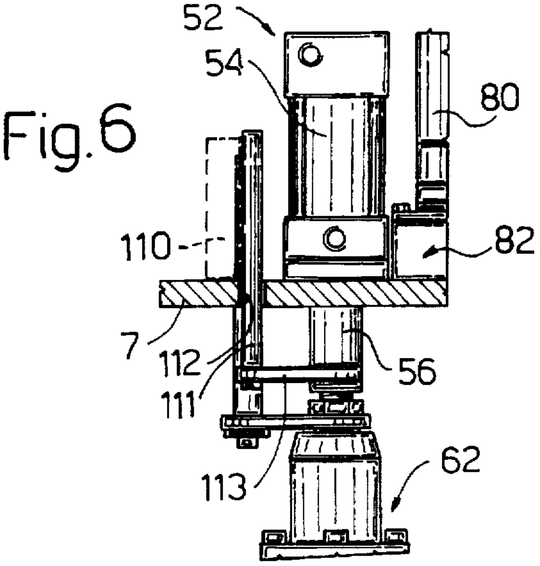
FIG. 6 shows a section of the device along line VI—VI in FIG. 5.
Figure 5:
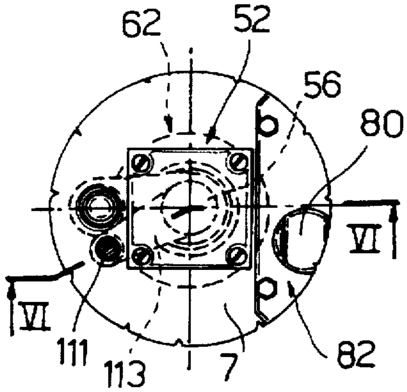
FIG. 5 shows a top plan view of a detail of the device according to the present invention.

Mixing device 1 also presents a second position sensor 110 (FIGS. 5 and 6) for determining the axial position of shaft 64 and hence the axial distance of selecting device 96 in relation to valves 24. Position sensor 110 conveniently comprises a linear sensor fitted to plate 7 and connected to an elongated element 111 extending through a hole 112 in plate 7, and the bottom end of which is connected to output member 56 by a transverse appendix 113.

Mixing device 1 also presents an electronic control unit 115 supplied with the signals generated by angular position sensor 107 and axial position sensor 110.

Electronic unit 115 in turn presents an electronic power circuit (not shown) for controlling pneumatic actuator 52, pneumatic motor 80 and hydraulic actuator 87.

In actual use, each delivery hose 39 is connected to a pressurized fluid supply device (not shown), and more specifically to the outlet of a pump (not shown), which draws fluid from a tank (not shown) containing paint or ink of a given colour; and each recirculating hose 40 is connected to the inlet of a respective tank into which the unused paint or ink is drained.

On the basis of a memorized program or by manual control, electronic unit 115 provides for opening a first valve 24 by starting pneumatic motor 80 to rotate shaft 64; and selecting device 96 rotates about axis 19 and along circumferences C1, C2 up to the selected valve (which position is detected by encoder 107) so that the end portion 101 of the valve engages the first or second opening 99, 100 (valve selection).

During rotation of shaft 64, hydraulic actuator 87 is idle so that punch 85 is detached from and does not interfere with the teeth of ring gear 84.

If the valve selected by electronic unit 115 is located along circumference C1, selecting device 96 is so positioned angularly that the end portion 101 of the valve engages first opening 99. Conversely, if the valve selected by electronic unit 115 is located along circumference C2, selecting device 96 is so positioned angularly that the end portion 101 of the valve engages second opening 100.

For first angular positions of the selecting device, first opening 99 is engaged by the control rod 33 of the valves along circumference C1; for second angular positions of the selecting device, second opening 100 is engaged by the control rod 33 of the valves along circumference C2; and the first and second angular positions are offset angularly by said angle $\beta$ of about 22°.

Correct engagement of end portion 101 by selecting device 96 is ensured by positioning device 83. More specifically, hydraulic actuator 87 is activated, and punch 85 is positioned between two teeth of ring gear 84 to angularly lock shaft 64 and establish a precise angular position of selecting device 96 along circumferences C1, C2.

By virtue of the T shape of opening 99, 100 and end portion 101, engagement of opening 99, 100 by end portion 101 provides for a fixed axial connection of control rod 33 and selecting device 96, at which point, electronic unit 115 activates pneumatic actuator 52 to move selecting device 96 along axis 19 towards upper plate 7 (opening of the valve). By controlling (by means of linear sensor 110) the travel of output member 56 and hence the axial displacement of rod 33, valve 24 may thus be opened a predetermined amount to dispense a predetermined amount of fluid, which falls into a cylindrical tank 116 beneath tray 89. Once the fluid is dispensed, selecting device 96 is moved along axis 19 towards cylindrical structure 9 to close valve 24 (closing of the valve).

Once the valve is closed, electronic unit 115 sets selecting device 96 to another angular position to select and open another valve.

Electronic unit 115 repeats the above operations for different valves so as to feed and mix predetermined amounts of different paints (or inks) inside tank 116.

The advantages of the present invention will be clear from the foregoing description. In particular, arranging valves 24 along two concentric circumferences provides for accommodating a large number of valves (e.g. thirty-two) on a small-size support, and so achieving an extremely compact mixing device capable of mixing a large number of different fluids. The valves along circumferences C1, C2 are selected and opened in an extremely straightforward manner using a single, extremely simple selecting device 96, so that the mixing device as a whole is both highly efficient and straightforward in design. The diameter of cylindrical structure 9 (e.g. 292 millimeters) corresponds with that of a commercial 25-liter cylindrical tank 116; and, when idle, nozzles 31 are positioned facing wall 90, so that any drips are collected in tray 89.

Clearly, changes may be made to the mixing device as described and illustrated herein without, however, departing from the scope of the present invention.

We claim:

1. A fluid mixing device, in particular for industrial inks and paints, comprising:

a plurality of valves forming at least a fluid inlet and an outlet nozzle; each valve presenting a control member for at least partially opening the valve;

wherein some of said plurality of valves are first valves which are spaced angularly along a first circumference and other ones of said plurality of valves are second valves which are angularly spaced along a second circumference, concentric with and inside said first circumference;

said first and second valves being angularly spaced relative to each other;

selecting actuating means for selecting one of said plurality of valves to be in one of an opened and closed position, said selecting actuating means including:

a first drive means for moving a gripping member of said selecting actuating means angularly along the first and the second circumference; and control means for controlling said first drive means to position said gripping member in one of a plurality of first positions angularly spaced along the first circumference and in one of a plurality of second positions angularly spaced along the second circumference; said first and second positions being angularly spaced in relation to each other, the gripping member when set in a first position singly engaging the control member of a selected one of the first plurality of valves and to be adjacent to the selected one of said valves to interact with the control member to one of open and close the selected valve; and said gripping member when set in a second position singly engaging the control member of a selected one of the second plurality of valves and to be adjacent to the selected one of said second valves to interact with the control member to one of open and close the selected one of said second valves.

2. The device as claimed in claim 1, wherein said gripping member is movable angularly about an axis through a center of said first and said second circumferences.

3. The device as claimed in claim 2, wherein said gripping member is movable back and forth along said axis by a second drive means; and said gripping member, when set to one of a first and a second angular position engaging said control member of the selected one of said valves in an axially-fixed manner to move the control member axially to one of open and close the selected one of said valves.

4. The device as claimed in claim 3, wherein the selecting actuating means includes a second drive means which comprises an actuating means having an output member movable axially along said axis;

said fluid mixing device further comprising a shaft fitted in an angularly-movable, axially-fixed manner to said output member; and said shaft being angularly movable by said first drive means, and having said selecting actuating means.

5. The device as claimed in claim 4, wherein said first drive means comprises:

a first gear integral with said shaft; and a pinion fitted to an auxiliary shaft parallel to said axis, and meshing with said first gear; and said pinion being movable angularly by the first drive means.

6. The device as claimed in claim 4, wherein said selecting actuating means further comprises a flat blade portion having a first and a second shaped opening;

said first shaped opening holding, in an axially-fixed manner, end portions of said control members of said first plurality of valves;

and said second shaped opening holding, in an axially-fixed manner, end portions of said control member of said second plurality of valves.

7. The device as claimed in claim 6, wherein said first and second openings are T-shaped; and said end portions of said control members have a T-shaped cross section.

8. The device as claimed in claim 4, wherein the mixing device includes supporting means for said plurality of valves said supporting means comprises a cylindrical body having a central through hole engaged by said shaft said shaft having an end portion projecting from said cylindrical body on a side edge thereof opposite to an edge portion of an actuating means; and said end portion supporting a drip tray having a first and a second opening that are positioned to face an outlet nozzle of a first and a second valve respectively.

9. A device as claimed in claim 8, wherein said supporting means further comprises a supporting plate for supporting said selecting actuating means;

said supporting means, supporting said valves and comprising a cylindrical body fitted to said supporting plate and separated from the supporting plate by elongated bodies extending between said supporting plate and said cylindrical body.

10. The device as claimed in claim 3, wherein the selecting actuating means further comprises a sensor means which comprising a first sensor means for determining an angular position of said gripping member about said axis; and a second sensor means for determining an axial position of said gripping member along said axis.

11. The device as claimed in claim 2, further comprising angular positioning and lock means for determining a number of stable angular positions of said gripping member about said axis.

12. The device as claimed in claim 11, wherein said angular positioning and lock means comprise a ring gear angularly integral with said gripping member; and a shaped body movable in a back and forth direction by an actuating means towards said ring gear; and said shaped body being insertable between two adjacent teeth of the ring gear to lock said gripping member in a predetermined angular position.

13. In a fluid mixing device, in particular for industrial inks and paints, comprising:

forming a plurality of valves into at least a fluid inlet and an outlet nozzle; each valve presenting a control member for at least partially opening the valve;

wherein some of said plurality of valves are first valves which are spaced angularly along a first circumference and other ones of said plurality of valves are second valves which are angularly spaced along a second circumference, concentric with and inside said first circumference; said first and second valves being angularly spaced relative to each other;

selecting actuating means for selecting one of said plurality of valves to be in one of an opened and closed position, said selecting actuating means including:

a first drive means for moving a gripping member of said selecting actuating means angularly along the first and the second circumference; and control means for controlling said first drive means in order to position said gripping member in one of a plurality of first positions angularly spaced along the first circumference and in a plurality of second positions angularly spaced along the second circumference; said first and second positions being angularly spaced in relation to each other;

the gripping member when set in a first position singly engaging the control member of a selected one of the first plurality of valves and to be adjacent to the selected one of said valves to interact with the control member and open/close the selected valve; the gripping member when set in a second position singly engaging the control member of a selected one of the second plurality of valves and to be adjacent to the selected one of said valve to interact with the control member and open/close the selected valve;

one of said first positions along said first circumference corresponds to a position where one of the first valves is disposed and one of the second positions along said second circumference corresponds to a position where one of the second values is disposed.

* * * * *

UNITED STATES PATENT AND TRADEMARK OFFICE

CERTIFICATE OF CORRECTION

PATENT NO. : 5,762,098

DATED : June 9, 1998

INVENTOR(S) : Michele MANZONE, et al.

It is certified that error appears in the above-identified patent and that said Letters Patent is hereby corrected as shown below:

Title page, column 2, between lines 2 and 3 (of the references cited - U.S. patent documents), insert:

--3,727,799 4/1973 Nixon..........................................................222/144.4--.

Between lines 17 and 18, insert

--OTHER PUBLICATIONS

Notice of opposition of March 13, 1998 against European counterpart application inclusive of Exhibits 2-10 alleged by opposer to constitute prior art--.

Signed and Sealed this

Twenty-eighth Day of November, 2000

*Attest:*

Q. TODD DICKINSON

*Attesting Officer*

*Director of Patents and Trademarks*